(12) United States Patent
Mohammed

(10) Patent No.: US 6,418,555 B2
(45) Date of Patent: *Jul. 9, 2002

(54) AUTOMATIC UPGRADE OF SOFTWARE

(75) Inventor: Mannan A. Mohammed, Chandler, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

(21) Appl. No.: 09/119,824

(22) Filed: Jul. 21, 1998

(51) Int. Cl.$^7$ .............................................. G06F 9/445
(52) U.S. Cl. ...................... 717/169; 717/175; 709/327; 710/8; 713/2
(58) Field of Search ................................ 710/8, 10, 62, 710/72; 713/1, 2, 100; 709/321, 327; 717/168–170, 174–175

(56) References Cited

U.S. PATENT DOCUMENTS

| | | | | |
|---|---|---|---|---|
| 5,548,759 A | * | 8/1996 | Lipe .............................. 707/100 |
| 5,668,992 A | * | 9/1997 | Hammer et al. ................ 713/1 |
| 5,742,829 A | * | 4/1998 | Davis et al. ................ 395/712 |
| 5,787,246 A | * | 7/1998 | Lichtman et al. ........... 709/220 |
| 5,826,090 A | * | 10/1998 | Mealey et al. ............... 395/712 |
| 5,870,610 A | * | 2/1999 | Beyda .......................... 395/712 |
| 5,951,684 A | * | 9/1999 | Jeon .............................. 713/1 |
| 5,974,474 A | * | 10/1999 | Furner et al. ................... 710/8 |
| 6,119,186 A | * | 9/2000 | Watts et al. ................. 710/104 |
| 6,178,468 B1 | * | 1/2001 | Rudd et al. ..................... 710/8 |

OTHER PUBLICATIONS

Plug and Play BIOS Functionality and Windows 95. Article [online]. Microsoft Corporation, Jan. 1995 [retrieved on 2000–01–03]. Retrieved from teh Internet: <URL:wysiwyg://800/http://msdn.microsoft.com/library/backgrnd/html/msdn_pnpbios.htm.*

Plug and Play BIOS Functionality and Windows 95. Article [online]. Microsoft Corporation, Jan. 1995 [retrieved on 2000–01–03]. Retrieved from teh Internet: <URL:wysiwyg://800/http://msdn.microsoft.com/library/backgrnd/html/msdn_pnpbios.html>.*

* cited by examiner

*Primary Examiner*—Tuan Q. Dam
(74) *Attorney, Agent, or Firm*—Trop, Pruner & Hu, P.C.

(57) ABSTRACT

A computer system includes an operating, a software component, and a program executable in the system to automatically upgrade the software component if it detects that the operating system has been upgraded from a previous version. The program may include a detection module that monitors for an operating system upgrade and an upgrade module that upgrades the software component if an operating system upgrade has been detected.

37 Claims, 9 Drawing Sheets

DRIVER.INF

Installs device drivers for a specific image processing program for Windows 98

; VERSION INFORMATION

Settings to identify version of device drivers (such as for Windows 95, Windows 98, or Windows NT)

; MANUFACTURER SPECIFIC INFORMATION

Manufacturer identification settings

; DEVICE SPECIFIC CONFIGURATION AND SETTINGS

Device specific settings, including identification of associated devices, events needed to trigger image processing application, and predefined parameters.

; GENERIC INFORMATION

Links to modules

Non-localizable settings

Localizable settings

*FIG. 7*

AUTOMATIC UPGRADE OF SOFTWARE

BACKGROUND

The invention relates to the automatic upgrade of software in a computer system.

Many different types of operating systems exist that provide an environment in a computer system in which application programs can run. One family of operating systems includes the different versions of the Windows operating systems provided by Microsoft Corporation. Windows operating systems that are currently available include Windows 95, Windows 98, and Windows NT. Examples of other common operating systems used include the Unix operating system and the OS/2 operating system.

When users upgrade their operating systems from one version to another (such as from Windows 95 to Windows 98 or from Windows 95 to Windows NT), many software components that were installed in the computer system under the original operating system may not work with the newly loaded operating system. Thus, the user may need to manually remove the original software components and reinstall new versions of the software components or otherwise manually perform other tasks to make the software components work with the newly loaded operating system.

With some operating systems, many high level application programs may be able to run without recompilation on different versions of the operating systems. In the Windows operating system, for example, such application programs are typically the user-mode or Ring 3 applications. However, certain other software components in a system, such as kernel mode or Ring 0 routines or modules (which include device drivers, dynamic link libraries, and so forth) are rarely compatible between different versions of operating systems. Thus, when a user migrates from one operating system to another, such low level software components may need to be re-installed manually in the system by the user. To do so, the user typically needs to find the diskette or CD-ROM on which such software components are stored and to manually load the components into the system.

Thus, there exists a need in which software components are automatically upgraded when a system migrates from one operating system to another.

SUMMARY

In general, the invention according to one embodiment features a system including a program executable in the system to automatically upgrade a software component if an operating system has been upgraded.

Other features will become apparent from the following description and from the claims.

BRIEF DESCRIPTION OF THE DRAWING

FIG. 7 illustrates an example, generic installation file.

DETAILED DESCRIPTION

Figure 1:
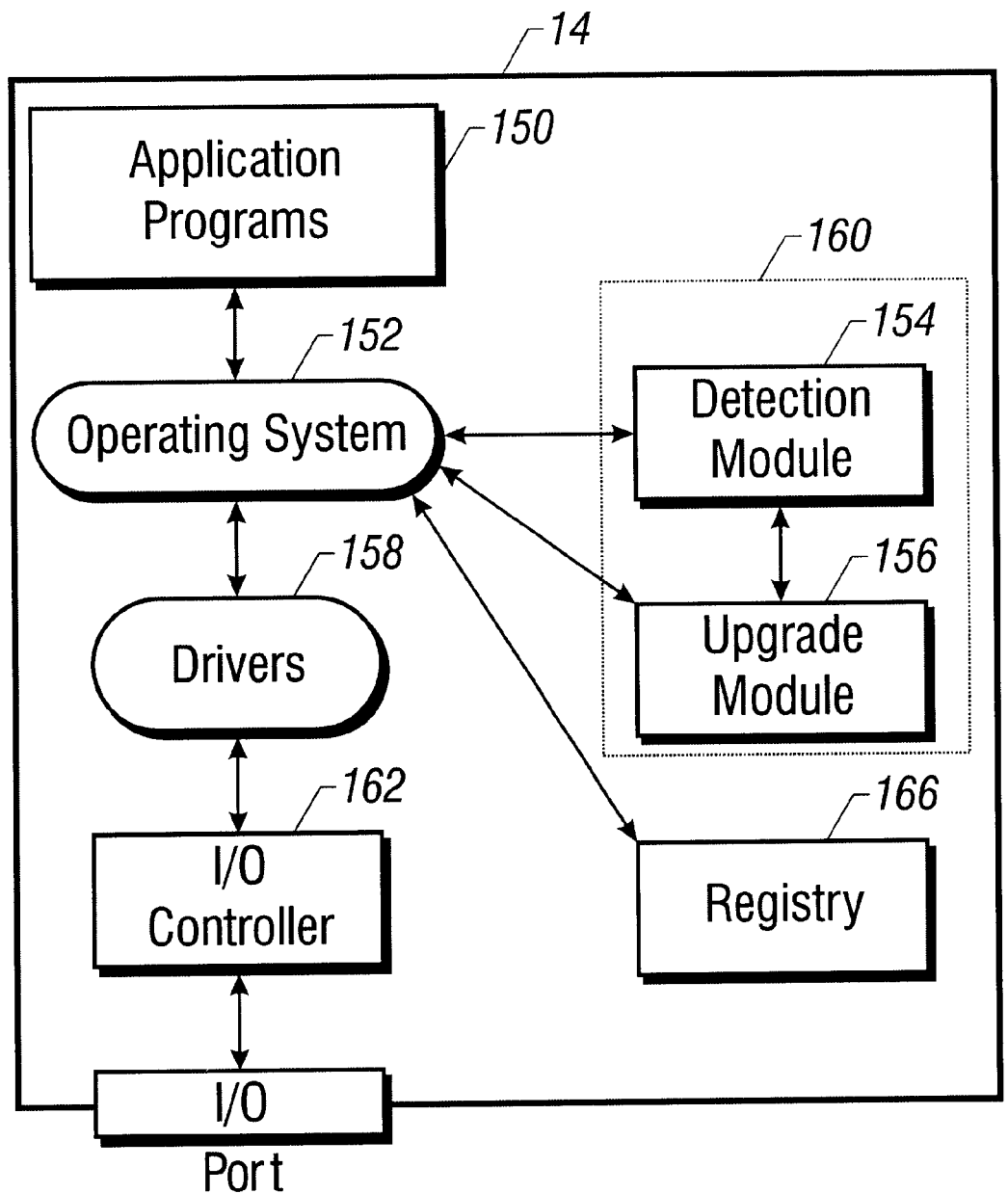
FIG. 1 is a block diagram of software levels in a computer system.

Referring to FIG. 1, according to some embodiments of the invention, an upgrade program 160 may be loaded in a computer system 14 (which may be a stand-alone computer or some other system, such as a digital imaging system) that is configured to detect an operating system 152 upgrade and to upgrade software components to work with the new operating system. In this description, upgrading a software component includes replacing the software component, updating the component, or both.

In one embodiment, the upgrade program 160 includes a detection module 154 running in the background and an upgrade module 156 that upgrades software components when an operating system upgrade is detected. The detection module 154 may be configured to detect an operating system upgrade each time the system is booted and to invoke the upgrade module if an operating system upgrade is detected. The upgrade program 160 may also alternatively be configured as one module that runs in the system 14 to perform the detection and upgrade tasks.

In addition, one or more application programs 150 and device drivers 158 may be running in the system 14. The device drivers 158 may act as the interface between one or more input/output (I/O) controllers 162 and the operating system 152. A database 166 (such as the registry in the Windows operating system) may also be used with the operating system 152 to store configuration settings for components in the computer system 14.

The following description is provided for software upgrades performed in Windows operating systems. However, it is contemplated that embodiments of the invention may be applied to software upgrades involving other types of operating systems, such as the Unix operating system and the OS/2 operating system.

In one embodiment, the detection module 154 may be a service daemon that is invoked every time the system is started. The service daemon may be registered with the operating system 152. The upgrade module 156 may be a self-extracting executable that has various components of software (such as different versions of device drivers, dynamic link library or DLL files, installation files such as "INF" files, and so forth) embedded in it. Alternatively, the software components may be separately stored in one or more storage media in the computer system 14. The upgrade module 156 may also be implemented as a dynamic link library file.

Figure 2:
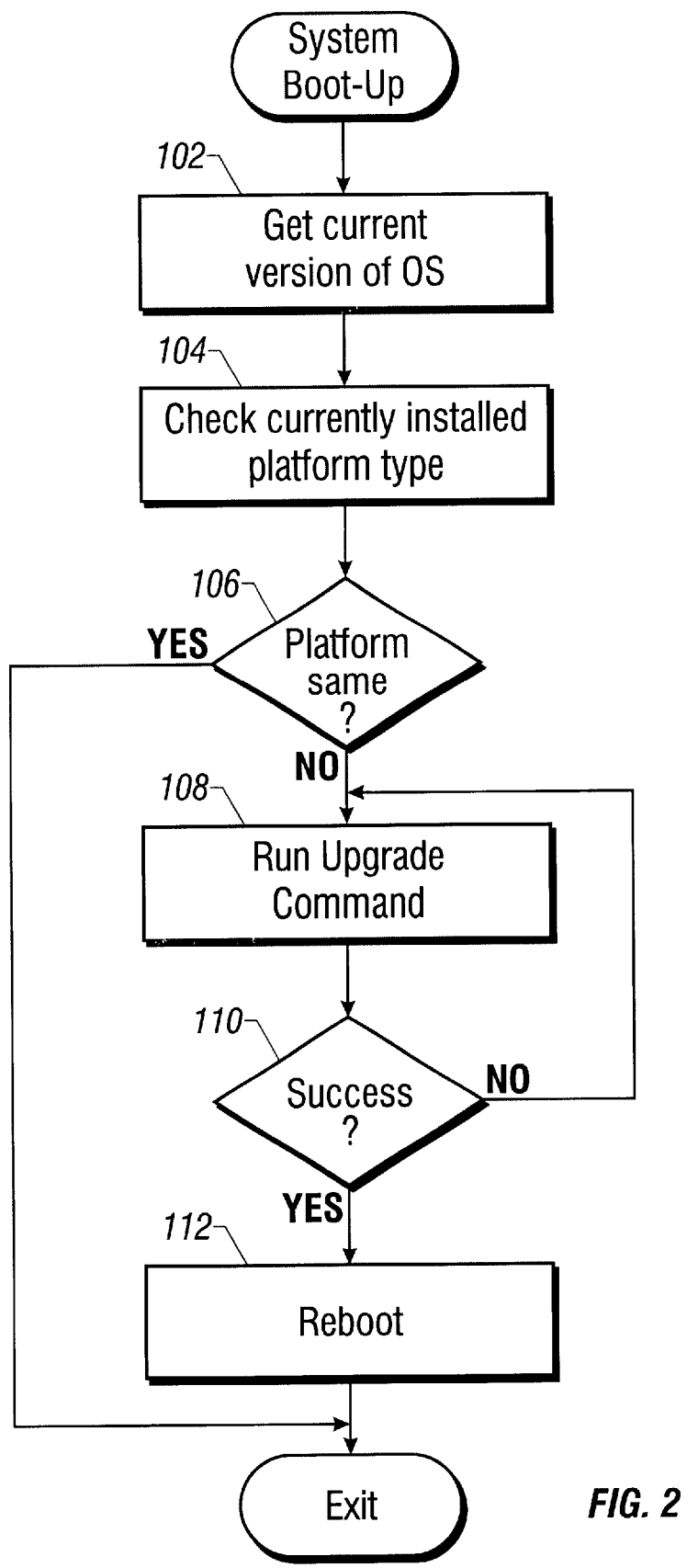
FIG. 2 is a flow diagram of a background module according to an embodiment of the invention that detects an operating system upgrade.

Referring to FIG. 2, a general flow of the detection module 154 is illustrated. On system startup, the detection module 154 determines (at 102) the version of the current operating system 152, referred to as the current OS platform. Next, the detection module checks (at 104) the operating system version (software OS platform) under which the currently installed software components were loaded. A comparison of the current OS platform and the software OS platform is then made (at 106). If the current OS platform is the same as the software OS platform (indicating an operating system upgrade has not occurred), the detection module 154 exits without performing a software upgrade.

However, if the detection module 154 detects that the software OS platform is different than the current OS platform (indicating that an operating system upgrade has occurred), then an upgrade command is issued (at 108) to invoke the upgrade module 156. Examples of some software components that may be upgraded include device drivers, DLL files, installation files and other low-level software components. In the ensuing description, such software components are referred to collectively as "target components." One or more of these target components may have to be upgraded when the operating system is upgraded to ensure that the device drivers and other software modules will work in the new operating system. It is to be understood, however, that the software upgrade process described may be applied to any number of software components that may be loaded in the system.

The detection module 154 waits until the upgrade has completed (step 110), at which point the detection module 154 may optionally cause the computer system 14 to reboot (at 112) so that the device drivers or other software modules for the newly installed operating system can be reloaded.

In one embodiment, when the detection module 154 is initially installed into the system, certain setup steps are performed which include updating entries in the registry 166. One registry entry update that may be performed during installation of the upgrade program is the creation of certain keys including a special upgrade key under which several entries may be set. The entries may include a Platform entry, a Restart entry, and a Command entry. The Platform entry may have a value that indicates the software OS platform for which the currently installed software components are configured. The Restart entry may have a value that indicates whether a reboot should be automatically performed after software upgrade occurs. The Command entry may specify the command line to invoke when an operating system upgrade is detected.

According to one embodiment, the Platform entry may be one of several values to represent the several possible operating systems that may be loaded in the system, including a value representing Windows 95, a value representing Windows 98, and a value representing Windows NT. The Restart entry has a value that may indicate whether a hidden restart is to be performed (the computer will reboot the computer without warning the user), a value that advises and the user to restart the computer, and a value that forces the user to restart the system after issuing a message. The Command entry holds the command line executable in the Windows operating system which may include a command to invoke the upgrade module 156.

Figure 3A:
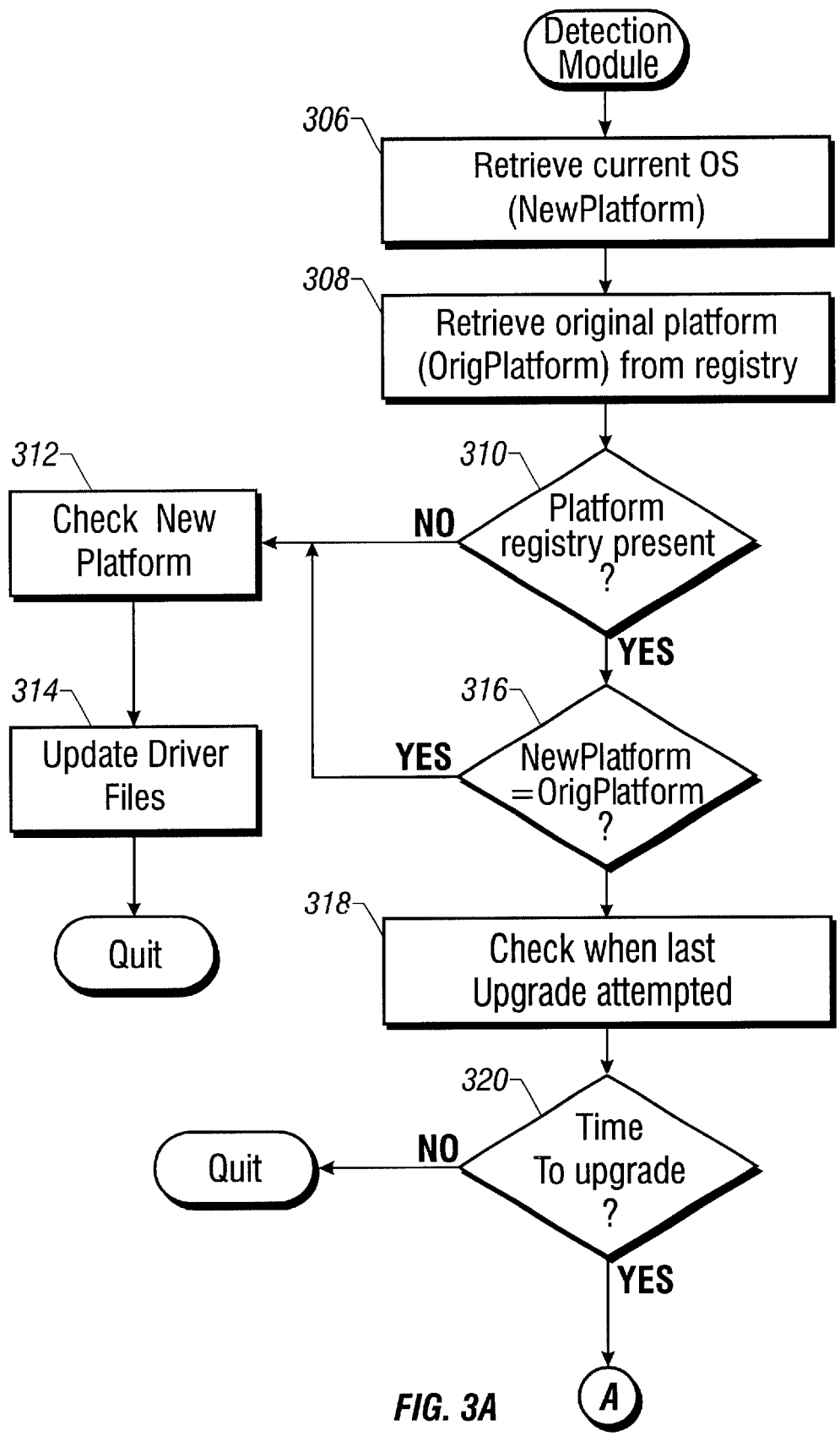
FIGS. 3A–3C are a more detailed flow diagram of the background module of FIG. 1.
Figure 3B:
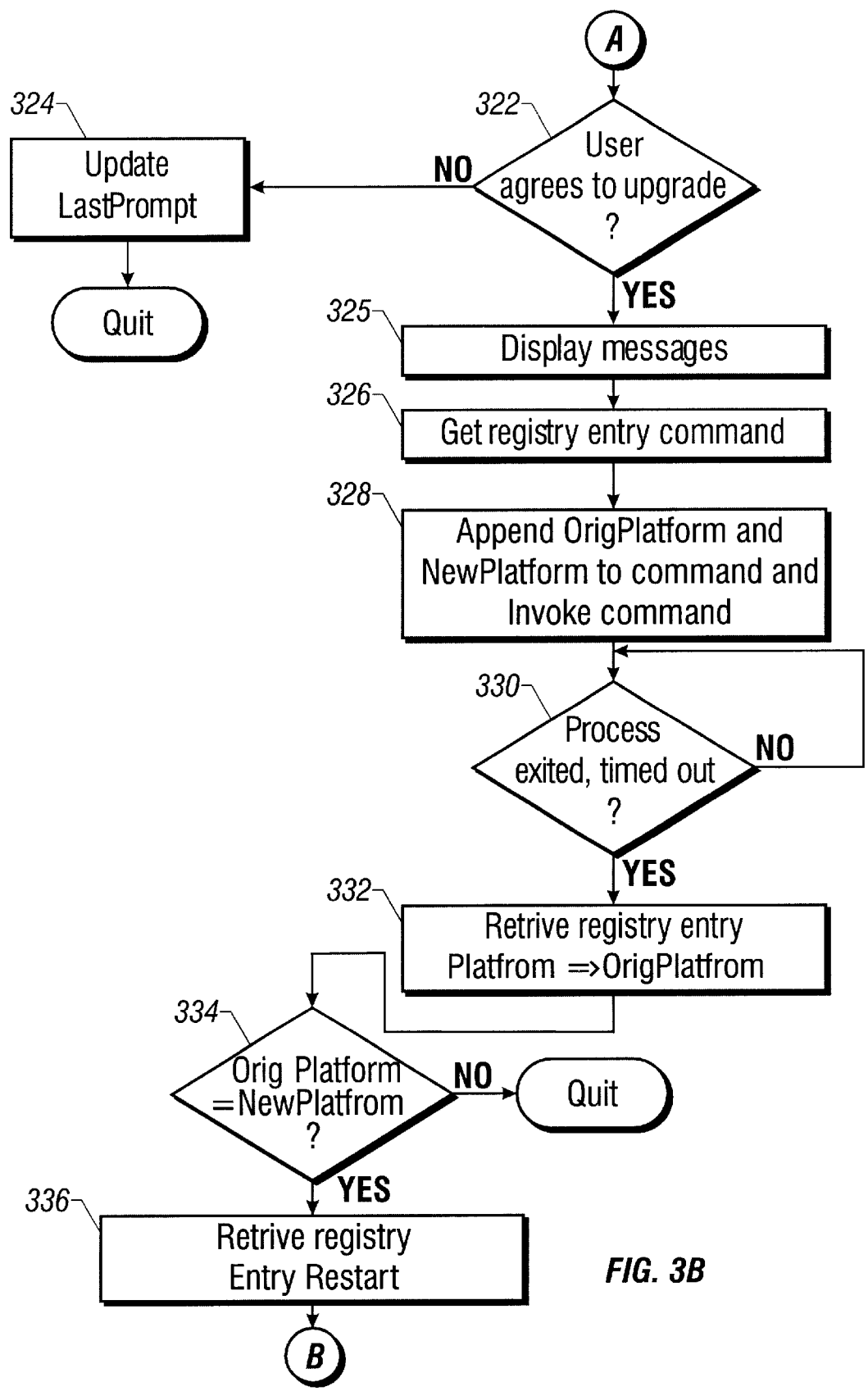
Figure 3C:
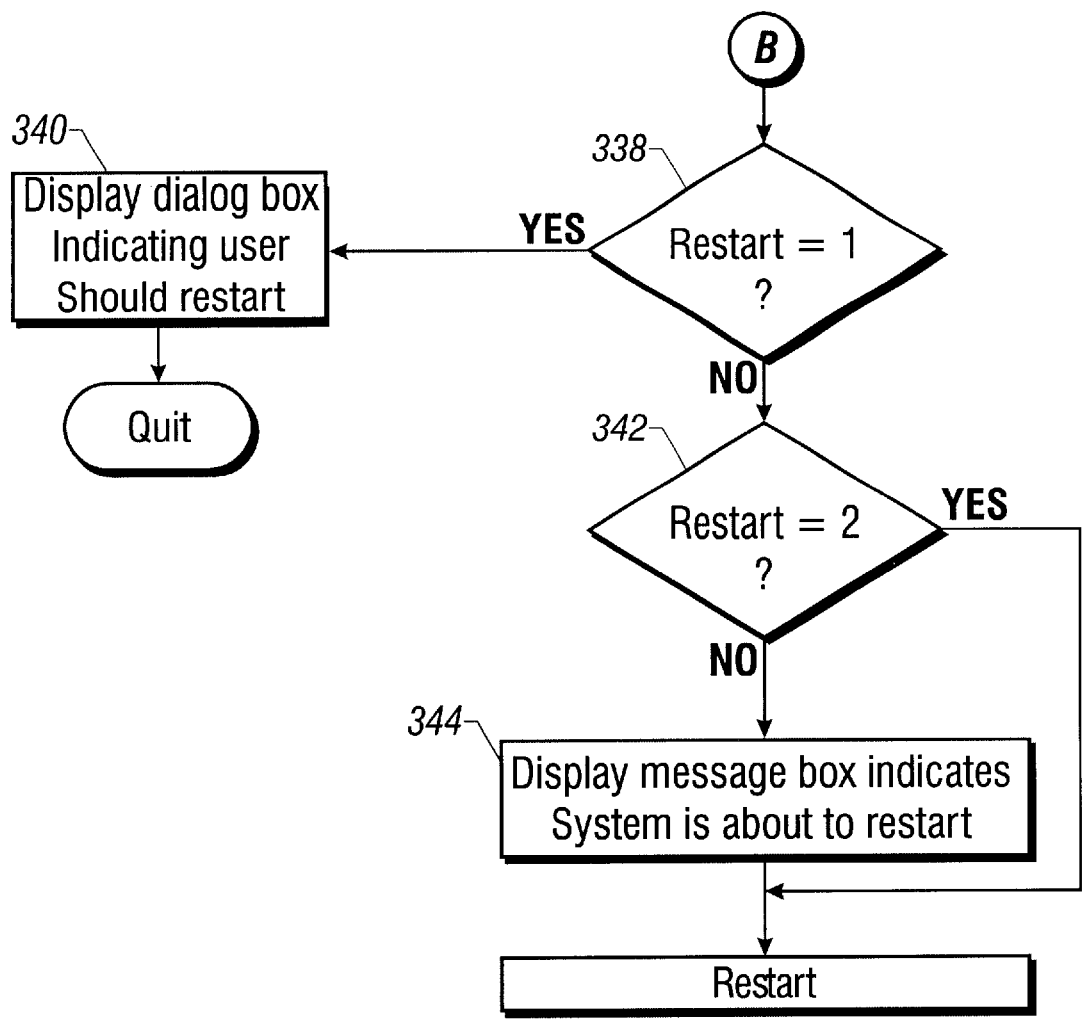

Referring to FIGS. 3A–3C, a more detailed flow diagram of the detection module 154 according to one embodiment is illustrated. The detection module 154 first retrieves the current version of the operating system (current OS platform) and stores the value in a parameter NewPlatform (step 306). In the Windows operating system, the method that may be used to retrieve the current OS platform is GetVersionEx(&osVersionInfo). Next, the detection module 154 retrieves a value representing the operating system platform (software OS platform, which may be stored in the operating system registry) under which software was loaded and stores the retrieved value into a parameter OrigPlatform (step 308).

The software OS platform registry entry may not be present, since it is possible for a user to install application software (in a host system) without associated device drivers being loaded. For example, an application program may be used in conjunction with a peripheral device (e.g., a digital camera). If the peripheral device is not plugged into the host system when the application program is installed into the host system, the necessary drivers may not be loaded. Thus, if the platform registry entry is not present (as determined at 310), the detection module 154 checks (at 312) the current OS platform value, NewPlatform. The target components corresponding to the new platform are then loaded (at 314) in the appropriate locations to properly set up the corresponding device drivers and other software modules.

Under the Windows operating systems, special initialization or installation files (referred to as "INF files") may be created to install programs (including applications and device drivers) in the system. An INF file may include such information as the vendor ID and device ID of an associated device driver. Other configuration information that may be stored in the INF file include preference and parameters settings of the device driver. To properly set up the device driver, the appropriate INF files, may be copied to a preselected directory (e.g., Windows ) and corresponding registry entries may be updated. An exemplary, generic INF file is illustrated in FIG. 7.

If the OS platform registry entry is present (as determined at 310), then a check is performed (at 316) to compare the values of NewPlatform and OrigPlatform. If the values are equal, that indicates that the current OS platform is the same operating system under which components in the system 14 software were loaded. Consequently, the loaded software components are likely to be compatible with the current OS platform, with at least one exception. If the user upgrades the operating system but then uninstalls the new operating system back to the original operating system, the values of NewPlatform and OrigPlatform may be the same but the incorrect version of the target components may be loaded in the preselected directory. When the new operating system is uninstalled, the registry entries are typically restored back to the settings of the original operating system, but the target components may not be updated. To ensure that the correct target components are residing in the preselected directory, blocks 312 and 314 are performed to update the target components of the current OS platform.

If the values of NewPlatform and OrigPlatform are determined (at 316) to be not equal, indicating that an operating system upgrade has occurred, the detection module 154 in the illustrated embodiment next checks (at 318) to determine when the last software upgrade was attempted. This may be done by looking at a specified parameter (LastPrompt) that contains the date and time that the user was last prompted to upgrade the software in response to an operating system upgrade. When the operating system is upgraded, the user may be prompted by the detection module 154 whether to upgrade or not software components loaded in the system 14 to work with the new operating system. The user may refuse, in which event the detection module 154 may periodically prompt the user to upgrade. A predetermined length of time (e.g., one week) between prompts may be set.

If the user has previously been prompted for a software upgrade and the user declined, but the time from the last upgrade is less than the predetermined period (as determined at 320), then the detection module 154 exits. However, if this is the first time through the upgrade process (user has not previously been notified of an operating system upgrade), or if the time since the last prompt is greater than the predetermined period, the detection module 154 in the illustrated embodiment then prompts the user to accept or decline (at 322) the upgrade of the loaded software because an operating system upgrade has been detected. If the user declines the software upgrade, the detection module 154 updates the value of LastPrompt (at 324) and exits. However, if the user accepts the upgrade (at 322), the detection module 154 may display certain messages (at 325) to indicate that the upgrade process is taking place. As another example, if the upgraded software components are associated with a peripheral device, such as a digital camera, the user may be prompted to disconnect the peripheral device from the host computer system before the software upgrade takes place.

In some embodiments, unplugging of the peripheral device is required because, while the peripheral device remains plugged in, the associated device drivers are loaded and running in the operating system. This may cause the device drivers to be locked by the operating system, which may prevent upgrade of associated components.

In the illustrated embodiment, the upgrade program 160 allows the user to make the decision of whether to perform the software upgrade or not. In an alternative embodiment, user interaction may be bypassed and automatic software upgrade may be performed by the upgrade program.

Proceeding with the upgrade process, the detection module 154 next retrieves (at 326) the command line, which may be stored in the Command entry of the operating system registry 166 that is used to invoke the upgrade module 156. The detection module 154 also appends (at 328) two arguments to the command line: OrigPlatform and NewPlatform. The upgrade module 156 is thus invoked to perform the software upgrade.

The detection module 154 at this point may optionally indicate to the user that the upgrade process is occurring while it waits (at 330) for the upgrade process to complete or time out due to a failure. At that time, the detection module 154 retrieves (at 332) the registry entry for the software OS platform and loads it into OrigPlatform. Next, the detection module compares (at 334) the parameters OrigPlatform and NewPlatform. If they remain unequal, then the software OS platform registry entry has not changed because the upgrade process has failed. The detection module 154 then exits. However, if OrigPlatform and NewPlatform contain the same value (as determined at 334), then the software upgrade was successful. The detection module 154 next retrieves (at 336) the Restart entry from the registry. In one example, the Restart entry may have three possible values: 0 to force the user to restart but displaying a message to indicate that the system is about to restart; 1 to prompt the user to restart the user may agree or decline; and 3 to perform a hidden restart (in which the user is not notified).

Thus, if the Restart entry contains the value 1, the detection module displays (at 340) the dialog box indicating to the user that the system should be rebooted and giving the user the option to do so. If the restart value is equal to 2 (as determined at 342), then a hidden restart is performed. However, if the restart value is 0, then a message box is displayed (at 344) to the user before the system is automatically started.

Figure 4:
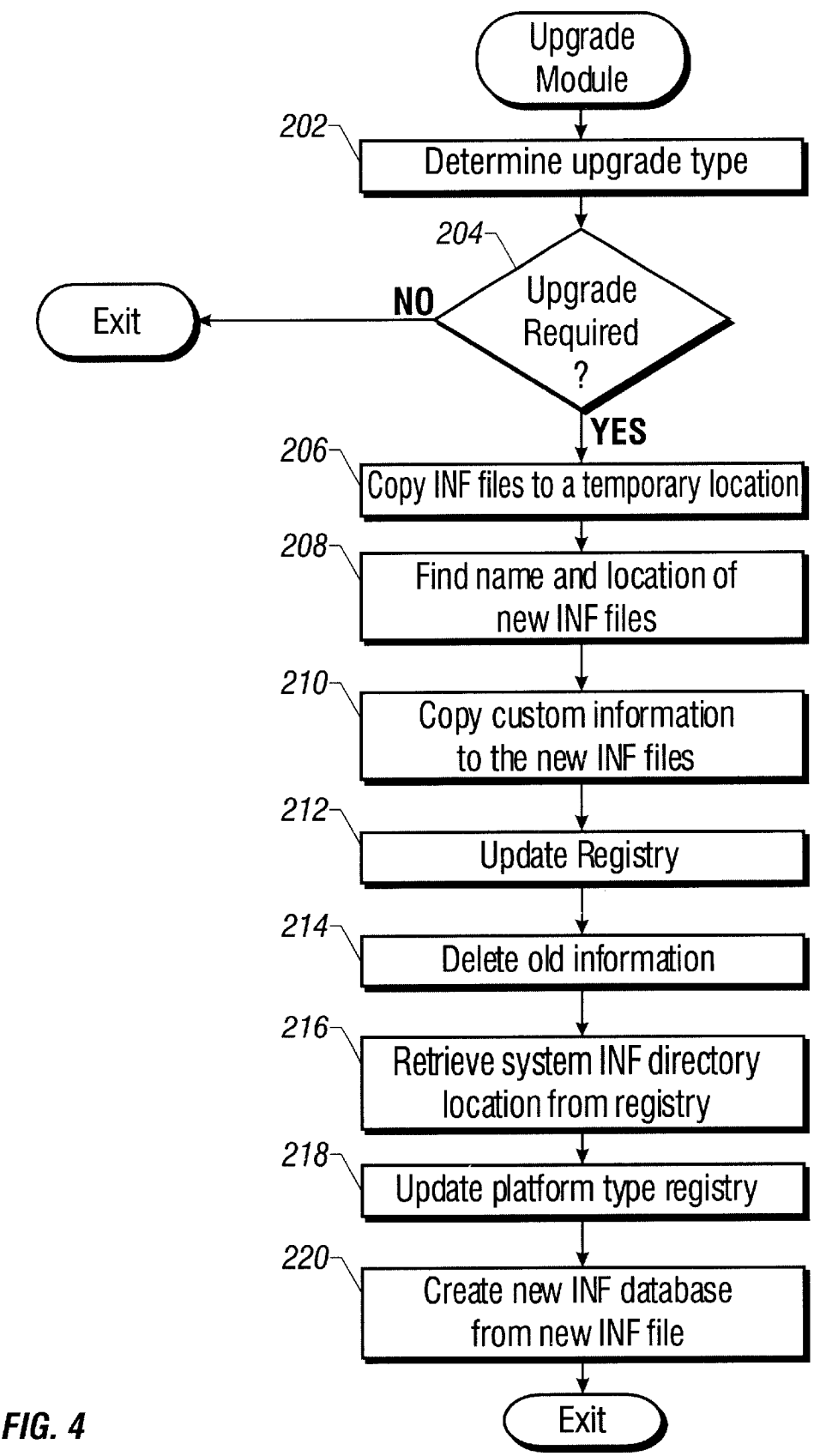
FIG. 4 is a flow diagram of an upgrade module according to an embodiment of the invention invoked by the background module to upgrade software when an operating system upgrade occurs.

Referring to FIG. 4, steps of the upgrade module 156 are illustrated. First, the upgrade module determines (at 202) the type of upgrade to be performed as indicated by Table 1 below.

TABLE 1

| | Software OS Platform | Current OS Platform | Upgrade |
|---|---|---|---|
| 1. | Windows 95 | Windows 98 | Windows 98 |
| 2. | Windows 95 | Windows NT | Windows 98 or Windows NT |
| 3. | Windows 98 | Windows 95 | Windows 95 |
| 4. | Windows NT | Windows 95 | Windows 95 |
| 5. | All Other | All Other | No Change |

In Table 1, the first column indicates the software OS Platformn (the platform under which the current software components were loaded), the second column indicates the current OS Platform (the currently running operating system, which may be newly installed), and the third column indicates the upgrade to be performed. For example, in row 1, if the software OS Platform is Windows 95 while the current OS Platform is Windows 98, then the software may be upgraded to be compatible with Windows 98. As another example, in row 2, if the software OS Platform is Windows 95 and the current OS Platform is Windows NT, then the software is upgraded to be compatible with either Windows 98 or Windows NT, since certain software components that are compatible with Windows 98 may be compatible with Windows NT, and vice versa. Rows 3 and 4 represent the cases where the Windows 98 and Windows NT operating systems are changed back to the Windows 95 operating system, respectively. In all other cases, according to one embodiment, no upgrade is required.

Based on the values of NewPlatformn and OrigPlatform, the upgrade module 156 determines (at 204) if an upgrade is required. If not, the upgrade module 156 exits. If an upgrade is required, then the target components are updated or replaced. Blocks 206–220 described below illustrate one embodiment of what is performed during the upgrade.

In the embodiment of the upgrade module 156 described in connection with FIG. 4, the device drivers, dynamic link library (DLL) files, and other low-level software components for the different versions of operation systems (e.g., Window 95, Windows 98, and Windows NT) are already loaded in the computer system 14. With some operating systems, different versions of device drivers, DLL Files, and other components that are compatible with different operating systems may all be kept in the computer system without adversely affecting operation. Thus, when an operating system upgrade occurs, these components are already available and thus only certain components need be upgraded, such as replacing and. updating one or more INF files and updating the registry entries.

Alternatively, it may be desirable to only keep one version of the software components in the system, in which case old versions are removed and new versions are added during the software upgrade. In yet another alternative embodiment, unused versions of software components may be maintained in the system but stored in a compressed format to maximize system storage capacity.

Referring again to the illustrated embodiment of FIG. 4, the current one or more INF files that need to be upgraded may be copied (at 206) to a temporary location. Next, the upgrade module 156 finds (at 208) the location and name of the INF files associated with the currently installed operating system. Custom information stored in the original INF files (labeled as "localizable settings" in FIG. 7) may be copied (at 210) to corresponding new INF files. The registry entries may be updated next (at 212) by deleting all entries associated with the software components that are to be upgraded. This may be done, for example, by invoking an uninstall routine associated with the software components that are to be upgraded. The uninstall routine may automatically remove the old registry entries.

Next, the upgrade module 156 may. delete (at 214) several types of information, including the old INF files as well as certain keys stored in the registry associated with the old device drivers. The system INF database associated with the device drivers may also be deleted. The system INF database is created by the operating system 152 and may include information from all the active INF files stored in the system.

Next, the system INF database location is retrieved (at 218) from the registry 166. The platform type entry in the registry 166: is then set (at 218) to the value of the newly loaded operating system, in this case NewPlatform. Next, the upgrade module 156 creates (at 220) a new INF database from the information in the new INF files. Once the new INF database is created, the new version of the device drivers and other modules have been successfully set up. When the computer is restarted, the new device drivers are loaded into the operating system based on information in the new INF database.

After the software upgrade is performed, the user is able to use the loaded software with the new operating system. One advantage offered by embodiments of the invention is that during the entire upgrade process, the user is never prompted for a CD-ROM or a floppy diskette containing a new version of the software. As a result, use of the software in the computer system 14 even when an operating system is upgraded is made more convenient. A further advantage offered by embodiments of the invention is that automatic detection of an operating system upgrade and automatic upgrade of software components are performed.

Figure 5:
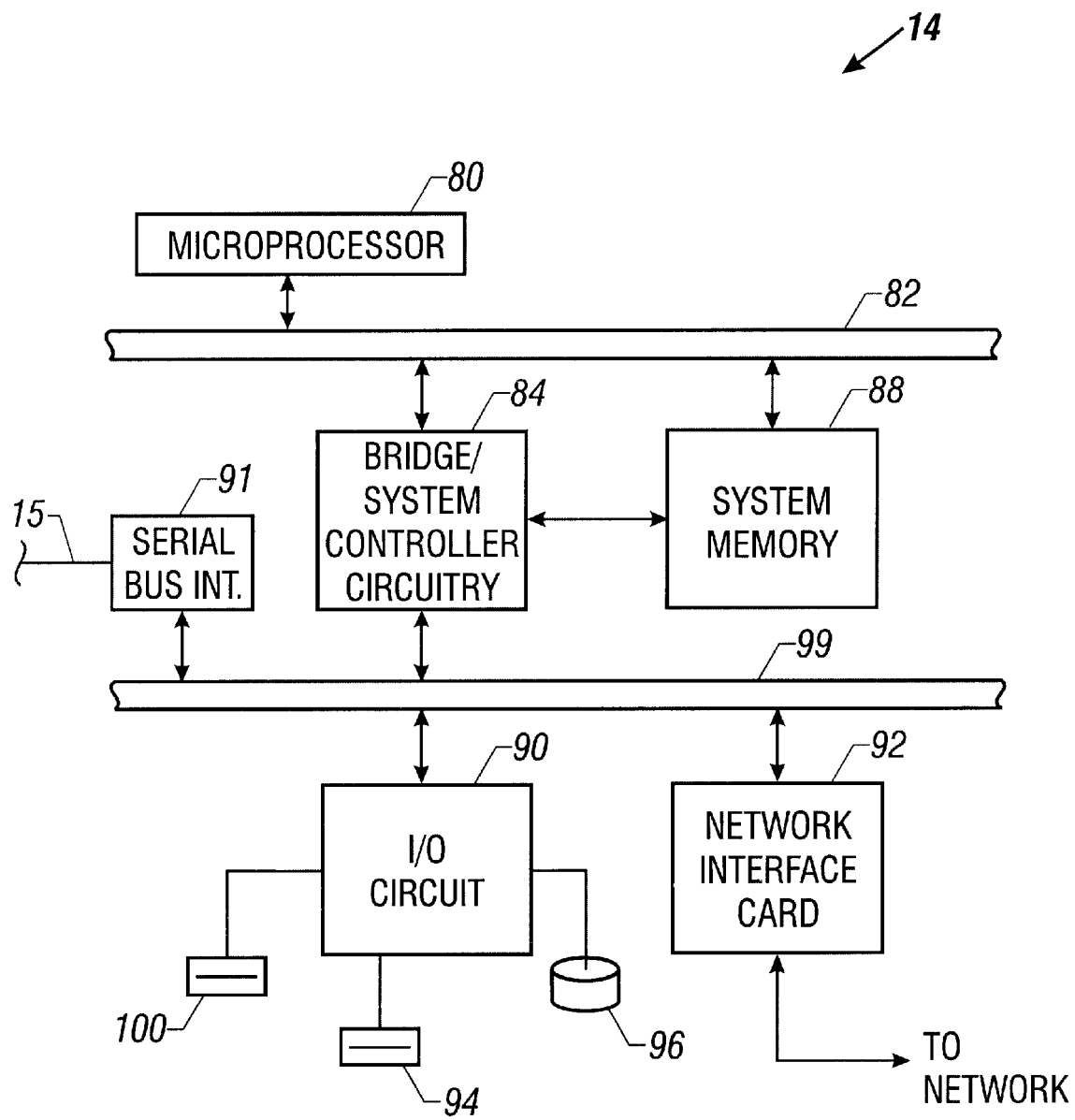
FIG. 5 is a block diagram of an example computer system incorporating an embodiment of the invention.

Referring to FIG. 5, in some embodiments, a computer 14 may include a microprocessor 80 that runs the upgrade program 16 according to embodiments of the invention. The system memory 88, the microprocessor 80, and a bridge/system controller circuitry 84 are all coupled to a host bus 82. The bridge circuitry 84 provides an interface from the host bus 82 to a downstream bus 99 that is coupled to an I/O controller 90 and a network interface card at 92, as examples. The computer 14 may also have, as examples a CD-ROM or DVD-ROM drive 100, a floppy disk drive 94, and/or a hard disk drive 96.

According to some embodiments, the upgrade program 16 may be stored on a suitable mass storage medium such as the CD-ROM or DVD-ROM drive 100, the floppy disk drive 194, or the hard disk drive 96. During execution, the program 16 or portions of the program 16 may be loaded into the system memory 88 for execution by the microprocessor 80.

Figure 6:
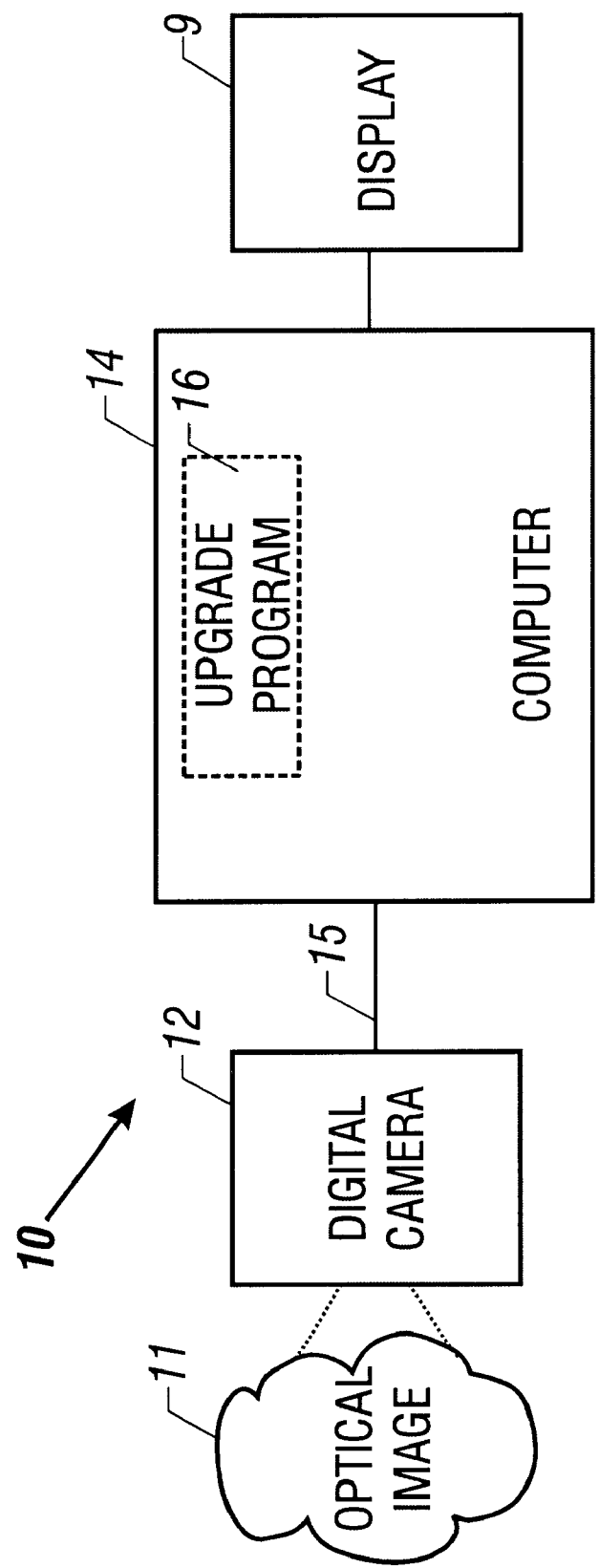
FIG. 6 is a block diagram of an example digital imaging system that includes the computer system of FIG. 5.

Referring to FIG. 6, in some embodiments, the computer system 14 may be used in a digital imaging system 10 that may include a digital camera 12 used to capture optical images 11. The camera 12 transmits streams of data representing the images to a computer 14 over a communication link 15 (which may be a serial link, for example) through a port of the computer system 14. Application programs may be loaded in the computer 14 that are used to process images captured by the digital camera 12 and transmitted to the computer 14. These application programs may be associated with device drivers that act as the interface to the computer port that connects to the digital camera 12.

Other embodiments are also within the scope with the following claims. Although embodiments of the invention have been described in connection with the Windows operating system, the automatic upgrade process described can also be applied to other types of operating systems.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A computer system, comprising:
    an operating system;
    a software component;
    one or more storage media containing pre-loaded information, the pre-loaded information comprising a different version of the software component; and
    a program executable in the computer system to detect if the operating system has been upgraded from a previous version and to automatically upgrade the software component if so, the program executable to upgrade the software component using the pre-loaded information stored locally in the one or more storage media.

2. The computer system of claim 1, wherein the program includes a detection module that monitors for an operating system upgrade.

3. The computer system of claim 2, wherein the detection module is invoked at each system startup.

4. The computer system of claim 1, wherein the program includes an upgrade module that upgrades the software component if an operating system upgrade has been detected.

5. The computer system of claim 4, wherein the program includes a detection module to detect an operating system upgrade, the detection module invoking the upgrade module if the operating system upgrade is detected.

6. The computer system of claim 1, wherein the program includes a service daemon that detects an operating system upgrade.

7. The computer system of claim 1, wherein the program includes a dynamic link library file.

8. The computer system of claim 1, wherein the software component includes a device driver.

9. The computer system of claim 1 wherein the operating system includes a WINDOWS® operating system.

10. The computer system of claim 9, wherein the software component includes an INF file.

11. The computer system of claim 1, wherein the software component includes an installation file associated with the software component.

12. The computer system of claim 11, wherein the program is executable to copy an installation file associated with the upgraded operating system to a preselected directory.

13. The computer system of claim 1, wherein the information includes a self-extracting routine containing the software component.

14. The computer system of claim 1, wherein the different version of the software component in the pre-loaded information is compatible with the upgraded operating system.

15. The computer system of claim 1, wherein the pre-loaded information comprises at least another version of the software component.

16. The computer system of claim 15, wherein the pre-loaded information comprises installation files for plural operating systems.

17. An article comprising one or more storage media containing a program executable in a computer system running an operating system, the program comprising:
    a first module executable in the computer system to detect if the operating system has been upgraded from a previous version; and
    a second module invocable by the first module to automatically upgrade at least a software component if the first module detects an operating system upgrade using installation information already stored in the computer system.

18. The article of claim 17, wherein the first module is executable in the background of the computer system.

19. The article of claim 17, wherein the second module is executable to upgrade a low-level software component when an operating upgrade is detected.

20. The article of claim 19, wherein the low-level software component includes a device driver.

21. The article of claim 19, wherein the installation information includes an INF file.

22. The article of claim 21, wherein the installation information includes an installation file associated with the software component that is copied to a preselected location.

23. The article of claim 17, wherein the operating system includes a WINDOWS® operating system.

24. A method of upgrading software in a computer system comprising:

running a first module to detect an operating system upgrade; and automatically upgrading at least one predetermined software component in response to detection of the operating system upgrade using information pre-loaded in the computer system, the pre-loaded information comprising a different version of the software component.

25. The method of claim 24, wherein the pre-loaded information further includes one or more files associated with one or more device drivers.

26. The method of claim 25, wherein the one or more files include installation files.

27. The method of claim 26, wherein the one or more installation files include INF files.

28. The method of claim 20, wherein the software component includes an operating system registry.

29. The method of claim 20, further comprising:

the first module invoking an upgrade module to upgrade the predetermined software component.

30. The method of claim 20, further comprising:

retrieving information already stored in the computer system to upgrade the software component.

31. The method of claim 24, wherein upgrading using the pre-loaded information comprises upgrading using the pre-loaded information comprising the different version of the software component that is compatible with the upgraded operating system.

32. The method of claim 24, further comprising storing pre-loaded information comprising the different version of the software component and at least another version of the software component.

33. The method of claim 32, wherein storing the pre-loaded information comprises storing installation files for plural operating systems.

34. An article including one or more storage media containing instructions that when executed cause a device to:

detect if an operating system running in the device has been upgraded from a previous version; and upgrade a software component if the operating system has been upgraded, the software component being upgraded by accessing information pre-loaded in the device, the pre-loaded information comprising a different version of the software component.

35. The article of claim 34, wherein the different version of the software component is compatible with the upgraded operating system.

36. The article of claim 34, wherein the instructions when executed cause the device to store the pre-loaded information, the pre-loaded information comprising the different version of the software component and at least one other version of the software component.

37. The article of claim 36, wherein the instructions when executed cause the device to store the pre-loaded information by storing plural installation files for plural operating systems.

* * * * *

UNITED STATES PATENT AND TRADEMARK OFFICE
CERTIFICATE OF CORRECTION

PATENT NO. : 6,418,555 B2
DATED : July 9, 2002
INVENTOR(S) : Mannan A. Mohammed

It is certified that error appears in the above-identified patent and that said Letters Patent is hereby corrected as shown below:

Column 9,
Lines 25, 27 and 29, "20" should be -- 24 --.

Signed and Sealed this

Twenty-second Day of October, 2002

Attest:

Attesting Officer

JAMES E. ROGAN
Director of the United States Patent and Trademark Office